United States Patent [19]
Bobbio et al.

[11] Patent Number: 5,961,031
[45] Date of Patent: Oct. 5, 1999

[54] METHOD AND APPARATUS FOR FORMING HYDROGEN FLUORIDE

[75] Inventors: Stephen M. Bobbio, Wake Forest; Thomas D. Dubois, Charlotte, both of N.C.

[73] Assignee: The University of North Carolina at Charlotte, Charlotte, N.C.

[21] Appl. No.: 08/975,611

[22] Filed: Nov. 21, 1997

[51] Int. Cl.[6] .............................. B23K 1/20; B23K 31/02
[52] U.S. Cl. .................... 228/203; 228/206; 228/211; 228/220
[58] Field of Search ............................. 228/206, 220, 228/211, 203

[56] References Cited

U.S. PATENT DOCUMENTS

| | | | |
|---|---|---|---|
| 4,921,157 | 5/1990 | Dishon et al. | 228/124 |
| 5,139,193 | 8/1992 | Todd | 228/180.2 |
| 5,192,582 | 3/1993 | Liedke et al. | 228/206 |
| 5,244,144 | 9/1993 | Osame et al. | 228/219 |
| 5,407,121 | 4/1995 | Koopman et al. | 228/206 |
| 5,492,265 | 2/1996 | Wandke | 228/205 |
| 5,609,290 | 3/1997 | Bobbio et al. | 228/206 |

OTHER PUBLICATIONS

Clavel et al., Vapor–Phase, Fluoride–Ion Processing of Jet Engine Super–alloy Components, Plating & Surface Finishing, Nov. 91, pp. 52–57.

Koopman et al. Fluxless Soldering in Air and Nitrogen, 43rd ECTC Proc., 1993, pg 595, Orlando, Fl.

Koopman et al., Fluxless Soldering for Chip–on–Board and Surface Mount, SMTA National Proceedings, Oct. 94, pg. 55.

*Primary Examiner*—Patrick Ryan
*Assistant Examiner*—Kiley Stoner
*Attorney, Agent, or Firm*—Lynn E. Barber

[57] ABSTRACT

A method of forming hydrogen fluoride (HF), to allow fluxless soldering, from a solid source such as potassium hydrogen fluoride (KF.HF) using a specialized apparatus, including a cartridge which is heated in a controlled atmosphere apparatus. The gaseous reaction product, HF, may be extracted from the apparatus either by itself or in a carrier gas (such as argon or nitrogen). The solid reaction product, potassium fluoride (KF), is an inert material which remains in the cartridge. The combination of the cartridge and KF may be safely disposed of as a unit or refilled with KF.HF under controlled conditions.

1 Claim, 3 Drawing Sheets

METHOD AND APPARATUS FOR FORMING HYDROGEN FLUORIDE

BACKGROUND OF THE INVENTION

1. Field of the Invention

This invention relates to methods for fluxless soldering, and in particular, to methods of obtaining hydrogen fluoride (HF) primarily for use in fluxless soldering.

2. Description of the Related Art

Fabrication and assembly of electronic circuits requires that certain components of the circuit be in electrical contact with each other. Thus, integrated circuits (chips) or other components such as resistors, capacitors, etc., are mounted on substrates such as printed wiring boards so that the chip and substrate make electrical contact and are held together with the substrate supporting the component.

Processes for connecting the components and the substrate generally involve soldering. The first step in most current soldering processes is a pre-cleaning and deoxidation of surface oxides, generally using a liquid flux material, such as a weak organic acid applied prior to soldering and activated during the soldering process (e.g., at 230° C.) in a wave solder bath. Different flux materials are used in the pre-cleaning step to prepare the surface to be soldered by removing contaminants including metal oxides from the solder surface.

The second step in soldering involves solder reflow and/or reflow joining. This step can occur only after all oxides are removed from the solder surface because the oxides prevent the wetting of the two surfaces to be joined by the soldering reflow. When solder is heated it reflows and joins the surfaces which are in contact with solder.

The third step is post-soldering cleaning to remove the flux residue. This step is particularly difficult due to the small size of typical electronic components, and the difficulty of getting the cleaning agents to reach the minute areas between components.

Numerous investigators have attempted to eliminate the flux requirement for soldering. Fluxless soldering, or soldering without use of a liquid flux, replaces the first step with an alternate treatment, and can eliminate the third cleaning step. One example of fluxless soldering methods is the process of Dishon and Bobbio which utilizes plasma excitation using innocuous fluorinated gases, such as $SF_6$ or $CF_4$, to remove surface oxides from solder surfaces (U.S. Pat. No. 4,921,157). It is believed that these and other fluorinated gases of non-reactive substances were used as a source of plasma dissociated fluorine atoms, so that these atoms would react with and fluorinate the tin oxide ($SnO_2$) surface layer on the solder. Once this reaction occurs, the solder surface tension is sufficiently lowered so that joining is possible. In this method, the joining or reflow may be done any time within two weeks of the fluorination.

Other more recent examples of fluxless soldering include wave soldering (U.S. Pat. No. 5,044,542 of Deambrosio), palladium enhanced fluxless soldering (U.S. Pat. No. 5,048,744 of Chang et al.), use of various inert gases (U.S. Pat. No. 5,139,193 of Todd), use of reducing agents such as lithium, calcium, strontium and cesium (U.S. Pat. No. 5,139,704 of Holland et al.), use of a laser beam (U.S. Pat. No. 5,164,566 of Spletter et al.), use of COHF (U.S. Pat. No. 5,071,486 of Chasteen), use of a heated reducing or non-reactive gas (U.S. Pat. No. 5,205,461 of Bickford et al.), and use of carbon-fluoride compositions (U.S. Pat. No. 5,380,557 of Spiro).

Most relevant to this invention is U.S. Pat. No. 5,609,290 of Bobbio et al. where it was found that use of HF, having very strong internal bonds and not dissociating easily to yield free fluorine, is an efficient method of fluxless soldering and provides a surface layer on the solder which allows fluxless reflow.

In addition to using the HF formed by the method of the invention with the apparatus of the invention, with solder on a surface, it may be used for treatment of solder powder which is used in solder paste. Conventional solder paste is a composite of solder powder and a vehicle which contains solder flux where the vehicle acts as a suspending medium for the powder. Solder paste may be applied to components and circuit boards in a number of ways including screen printing. During reflow, the flux dissolves surface oxides on the powder to allow the powder particles (now liquid) to flow smoothly together and to the parts to be joined. As with other conventional soldering processes, the flux leaves a residue which should be cleaned after joining. Using HF formed by the method of the invention also allows fluxless soldering with solder paste in which the solder powder has been pretreated using the methods described herein.

Other objects and advantages will be more fully apparent from the following disclosure and appended claims.

SUMMARY OF THE INVENTION

The method of the invention comprises formation of hydrogen fluoride (HF) which may be used to allow fluxless soldering. According to this invention, the HF may be obtained from the thermal decomposition of a solid source such as hydrogen fluoride (KF.HF) using a specialized apparatus. Production of the HF in the way described herein is an improvement over the previous methods in that the KF.HF is a solid material which can be conveniently and safely handled and which produces a very pure anhydrous form of the noxious gas, HF, only when heated above its thermal decomposition temperature (239° C.). The reaction is

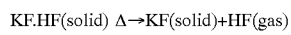

KF.HF(solid) Δ→KF(solid)+HF(gas)

In one embodiment of the present invention, the KF.HF is contained within a cartridge which is heated in a controlled atmosphere apparatus. In such a controlled atmosphere, the most important factor is that there is very low moisture. Preferably there is 10/760,000 or 13 ppm water. Dryness (having less than about 13 ppm) is mainly important to avoid damage to the processed parts during the fluxless process, for example, the $SiO_2$ layers on the parts. Although argon is preferably used as the carrier gas at atmospheric pressure, a slightly reduced pressure below 1 atm is safer. Normally, the source chamber is evacuated to a very low pressure to ensure that water has been removed, but a hot carrier gas can also be used to reduce moisture. Oxygen gas may also be used as the carrier gas. The gaseous reaction product, HF, may be extracted from the apparatus either by itself or in a carrier gas (such as argon or nitrogen). The solid reaction product, potassium fluoride (KF), is an inert material which remains in the cartridge. The combination of the cartridge and KF may be safely disposed of as a unit or refilled with KF.HF under controlled conditions. At the point of use, only the cartridge needs to be handled. Only when the loaded cartridge is heated to 239° C. or above is it as dangerous as a cylinder of compressed HF.

The HF formed by the invention allows soldering without requiring a pre-soldering fluxing step or a post-soldering cleaning step. The method results in a treatment of the solder which enables the solder to be reflowed on the surface for up to two weeks. The method may be performed at a temperature of about 10°–250° C. (preferably 80° C.) and an exposure time of between 0.5 minute and one hour (preferably 1.5 minute). The higher temperature allows for in-situ reflow treatment. The method is preferably used with tin lead solder applied to a surface of tin lead solder, tin plated parts, copper parts or gold plated parts. The method may be used to allow two parts to be joined together or to prepare one of two parts to be joined by soldering. Another application of the method is the treatment of solder powder which is used in solder paste.

Other aspects and features of the invention will be more fully apparent from the following disclosure and appended claims.

DETAILED DESCRIPTION OF THE INVENTION AND PREFERRED EMBODIMENTS THEREOF

The present invention provides a method of forming HF which may be utilized to provide a surface for fluxless soldering of electronic components. The HF may be used for methods utilizing solder or solderable metal (e.g., tin or copper) on a surface and for treatment of solder powder which is used in solder paste.

Solder, including also solder preform or solder already coated on a surface, or solderable metal on a surface is exposed to the HF vapor, which is not thermally dissociated, to form a surface layer in which the fluorine is bound, and which allows soldering to occur as if the surface had been pre-cleaned with a fluxing step with the important additional advantage that a post-soldering removal step is not required. The disclosure of U.S. Pat. No. 5,609,290, which discusses the use of HF in fluxless soldering and the likely mode of action thereof, is incorporated herein by reference.

The preferred method of using the HF of the invention does not require use of a full vacuum and can actually be performed at slightly greater than atmospheric pressure if proper steps are taken to ensure safe removal of exhaust gases. Preferably, from the point of view of safety, the use of the HF is at a pressure slightly less than atmospheric pressure so that any leakage will be into the system, and exhaust gases will not be released from the system. The typical high soldering temperatures for the pre-solder treatment with HF are not required. Thus, the HF treatment may be performed at a temperature of about 10°–250° C., although about 80° C. is preferred.

Figure 1:
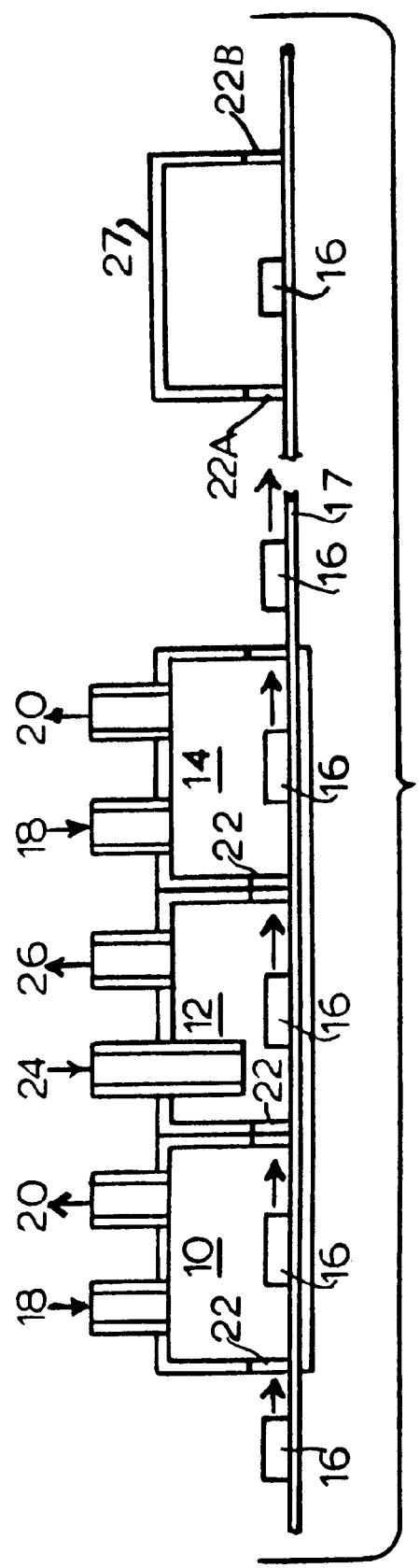
FIG. 1 is a schematic drawing of a manufacturing version of an apparatus which may be used for using the HF formed by the invention.

A manufacturing version of the apparatus for utilizing the HF, shown schematically in FIG. 1, includes preferably three chambers 10,12,14 arranged so that the items 16 to be soldered, such as circuit boards, move in sequence through the chambers by means of a conveying system 17. The first chamber 10 and third chamber 14 contain a gas inlet 18 and exhaust outlet 20 through which a suitable safe gas is passed (e.g., dry air, nitrogen or argon). A safe gas curtain 22, as is known in the art, forms a barrier across the chamber openings through which the circuit boards move. The purpose of these chambers is to isolate the second or middle chamber 12 from the outside world. The fluxless soldering treatment is performed in the second chamber 12 which contains a gas inlet 24 and exhaust outlet 26 for the process gas which may be pure anhydrous HF, or HF in a carrier gas, such as argon or nitrogen. The middle chamber 12 should be heated to the preferred temperature, e.g., 80° C. Alternatively, for enhanced isolation of the process, the first and third chambers may be configured as evacuable, or partially evacuable, load locks. Moreover, recirculating means may be used in the second chamber to minimize the amount of hazardous effluent. In all cases, exhaust gases containing HF should be scrubbed (e.g., reacted with $Ca(OH)_2$(aq.) to produce $H_2O$ and $CaF_2$ as a precipitate).

The HF treatment method may be performed in a stand-alone apparatus, with reflow being performed later or in a different location by means known in the art. Alternatively, the method may be performed in an in-line system together with a reflow system (shown as optional chamber 27 in FIG. 1), such as solder wave reflow, or an $N_2$ or air belt furnace having its own entrance 22A and exit 22B (FIG. 1), which in many cases are simply openings to the atmosphere. A third alternative for soldering is in-situ treatment in which HF is provided in the reflow system, such as an HF belt furnace so that both the HF treatment and the solder reflow or joining occur in the same chamber. The source of the HF does not affect how the HF can be used.

For treatment of solder powder used in solder paste, the solder powder may be pretreated in HF and incorporated in a neutral vehicle which does not contain flux but which is chosen to evaporate cleanly during reflow (leaving no residue) or to leave easily cleaned residues, and which does not interact with the fluorinated tin oxide surface on the powder in any deleterious way which obviates the pretreatment.

Figure 2:
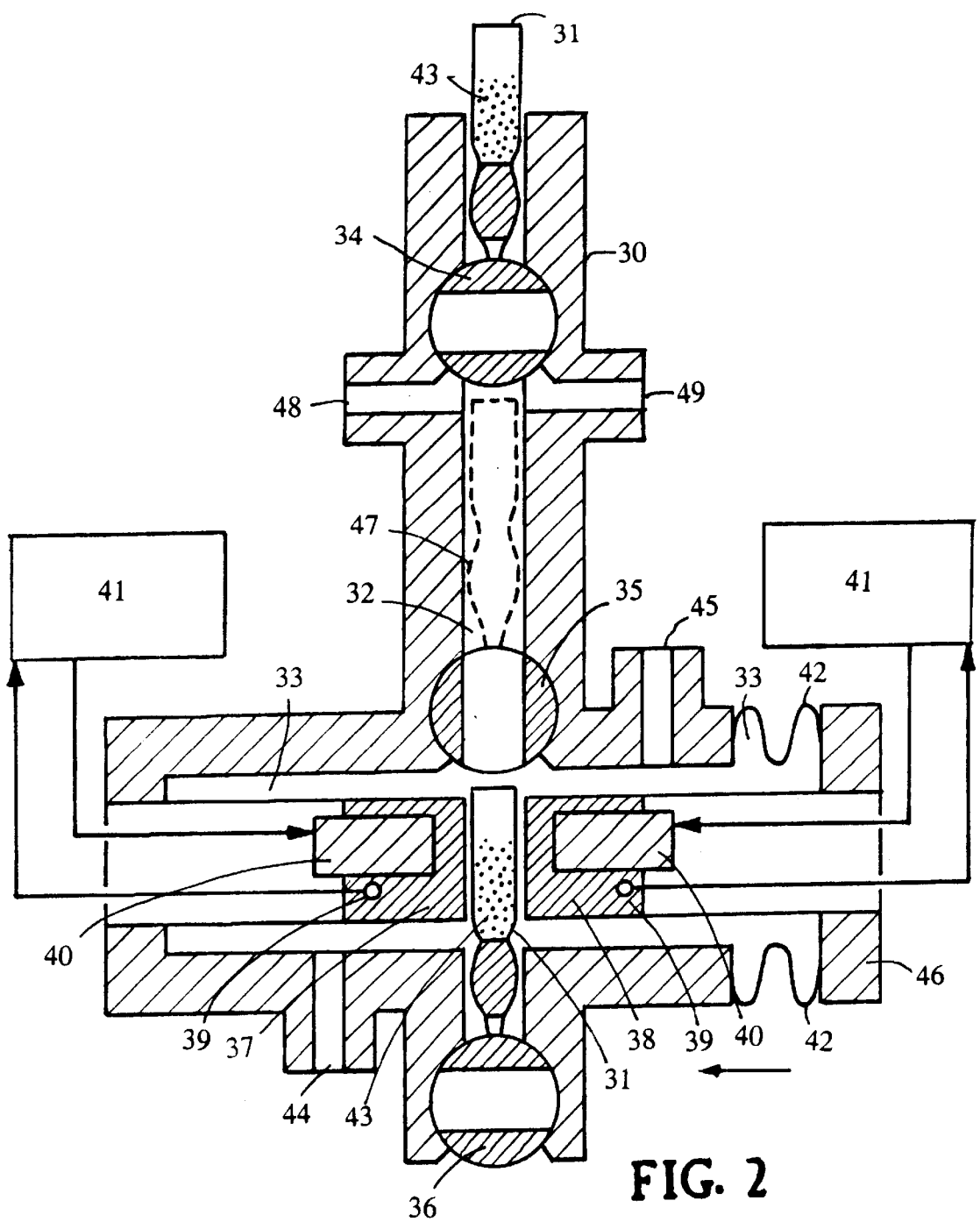
FIG. 2 is a schematic drawing showing an apparatus using KF.HF to produce HF as a process gas for fluxless soldering and for the apparatus in FIG. 1.

An apparatus for producing the process gas and which may be connected to the gas inlet 24 in FIG. 1 is shown in FIG. 2. The overall apparatus 30 is constructed of metal (e.g., stainless steel), and contains two controlled atmosphere chambers 32 and 33. The KF.HF, in the form of crystals, is contained within a cartridge 31, which moves in a downward direction under the influence of gravity, through chamber 32 of the apparatus 30 as shown in FIG. 2. The motion of the cartridge 31 is controlled using the ball valves, 34, 35, 36, shown in FIG. 2. The apparatus is shown under a condition where one cartridge 31 is held at the inlet of the apparatus by means of a closed ball valve 34. A second cartridge 31 is held in a position awaiting heating by means of the closed ball valve 36. The system operation is as follows. The movable heater 38 is moved to the left (as viewed in FIG. 2) as shown by an arrow in FIG. 2 until the cartridge is wedged between both heaters 37 and 38. Heat flows from the heaters through the metal walls of the cartridge (31) so as to thermally decompose the KF.HF crystals 43 contained within. During this process all valves 34–36 are closed and a carrier gas, such as argon or nitrogen, may be flowed through the inlet 44. During decomposition, HF is evolved into chamber 33 and the mixture of HF and carrier gas may be extracted through the outlet 45. This outlet 45 may be connected through suitable control valves to the inlet of the solder treatment system, for example, inlet 24 in FIG. 1. Motion of the movable heater 38 within chamber 33 (shown by the arrow) is accommodated using bellows 42 and a suitable linear mechanical stage (not shown) connected to flange 46 in FIG. 2. Heaters 37 and 38 are themselves composed of a thermally conductive metal such as copper or aluminum and are provided with resistive heating elements 40 and thermocouples 39 to measure their temperature. The heating elements 40 are electrically powered using the temperature controllers 41 in a closed loop so as to maintain constant temperature, as is known in the art. The actual temperature of the heaters must be in excess of the KF.HF decomposition temperature, 239° C., and in practice, is preferably about 300° C. The maximum temperature is only limited by the materials, such as the insulation on the heater wires, and thus temperatures as high as about 400° C. should be possible. At the end of the heating cycle, the movable heater 38 is moved to the right away from the cartridge, thus freeing the cartridge. The spent cartridge is removed from the apparatus by opening valve 36 which allows the cartridge to drop to a containment bin (not shown) which itself may be sealed and exhausted. This process occurs at the ambient pressure that exists inside the source chamber.

Valve 36 is closed and valve 34 is opened allowing a new cartridge to fall into a position directly above closed valve 35. This position is indicated by dashed lines 47 in FIG. 2. Valve 34 is closed and valve 35 is opened allowing the new cartridge to fall between the heaters. Valve 35 is closed and chamber 32 is exhausted by passing a purge gas (e.g., dry argon or nitrogen) through it. The purge gas enters at inlet 48 and leaves at the outlet 49 (FIG. 2). Alternatively, inlet 48 may be permanently closed, and a pump may be connected at outlet 49. The intent of the purge process is to ensure that no residual HF in chamber 33 may find its way back through chamber 32 and to the environment when valve 34 is opened. Another cartridge is placed over the closed valve 34 and heater 38 is moved into position to begin another cycle.

Figure 3:
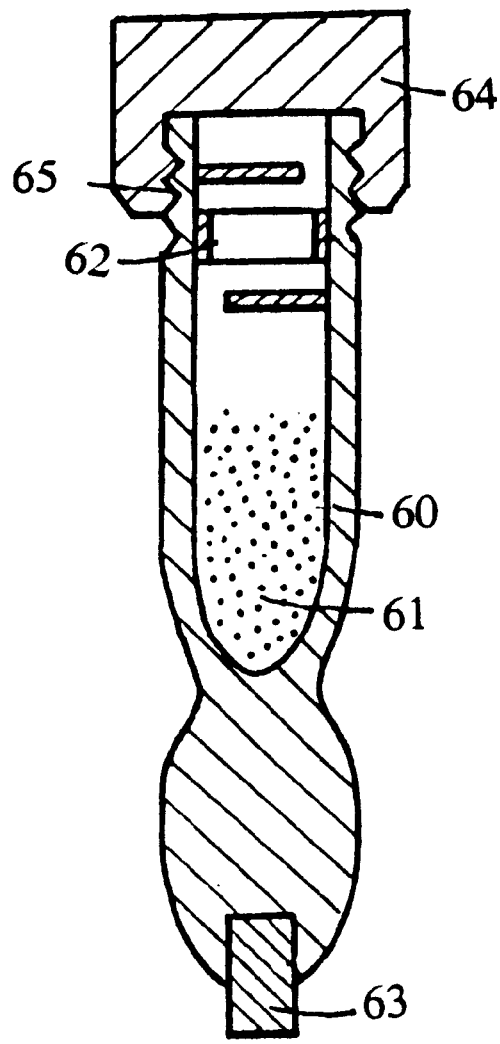
FIG. 3 is a cross-sectional view of a KF.HF cartridge for the apparatus in FIG. 2.
Figure 4:
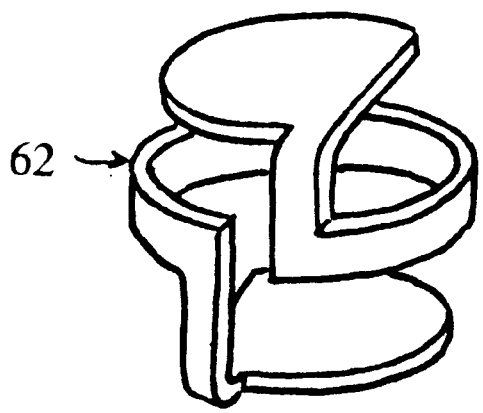
FIG. 4 is a perspective view of the baffle shown in FIG. 3.

A more detailed view of the cartridge is shown in FIG. 3. The main body 60 of the cartridge 31 is composed of metal (e.g., aluminum or thin wall stainless steel) which is thermally conductive to allow heat to flow from the heaters to the KF.HF crystals 43. The crystals 43 should not entirely fill the cartridge to prevent the boiling KF.HF from escaping as a condensed material to coat various internal parts of the apparatus shown in FIG. 2. To this same end, the cartridge may also be provided with a baffle 62 shown both in section (FIG. 3) and perspective (FIG. 4). The baffle 62 may be formed by punching it out of thin metal (e.g., stainless steel) using a suitable die and then bending it to realize the three-dimensional shape shown in FIG. 4. During operation, the cartridges fall onto a portion of the mechanism of the ball valves 34,35,36 used to control their motion. To avoid damaging the valves, the cartridges may be provided with a soft point 63 (FIG. 3). The material of the soft point may be lead or a high temperature plastic, such as polyimide. Because KF.HF is a hygroscopic material, and to prevent any direct contact with the KF.HF, the cartridges may be covered with a cap 64 (FIG. 3). The cap 64 may be provided with a screw thread 65 to facilitate automated opening.

In the method of using the HF formed by the invention, the surface upon which the solder is reflowed may be solder precoated on a surface, tin, copper or gold, which includes surfaces plated with these substances.

When the substance to be soldered and which is exposed to the gas is treated or untreated solder precoated on a surface, solder preform, solder in a powder form which will be incorporated in a solder paste at a future time, or molten solder as in a solder wave machine, the surface may be solder precoated on a surface, tin, copper, or gold, which has been treated with said strongly internally bonded fluorine-containing gas; or solder precoated on a surface, tin, copper, and gold, which has not been treated with said strongly internally bonded fluorine-containing gas.

When the solder is untreated solder precoated on a surface, untreated solder preform, untreated solder in a powder form which has been incorporated in a solder paste, or molten solder as in a solder wave machine, the surface may be solder precoated on a surface, tin, copper, or gold, which has been treated with said strongly internally bonded fluorine-containing gas.

Finally, the preceding description for use of the HF formed by the method of the invention and using the apparatus of the invention has been directed to the complete elimination of flux and flux cleaning in the soldering process. The methods described above may also be used to improve the reliability of processes which use mild or weakly activated flux. Such fluxes may require only very mild cleaning or no cleaning at all. As examples, the flux residue may be noncorrosive so that it may be formulated to evaporate during the reflow so that it leaves no residue. In use of HF in this invention, the HF treatment must be done as a pretreatment prior to flux addition, but the flux must be added after the HF, since the HF cannot easily permeate the flux to reach the solder surface. The exception might be where the HF is used in situ with the reflow and as the flux boils off some of the solder surface may be exposed to the gas. Any of the same substances to be soldered may be used as described above so long as they can be treated with the HF before flux is added and the same surfaces on which the solder is to be later reflowed are appropriate.

Although the preferred embodiments of the invention herein relate to HF as formed from KF.HF as the fluorinating agent, analogous methods using other sources of fluorine-containing gases could be used, such as sodium hydrogen fluoride, using a lower temperature and a more robust cartridge with a fine mesh over it, so that only the gas would be allowed to leave the cartridge. Due to the known characteristics of this compound, handling would be much more dangerous, and appropriate safety precautions known in the art would be required.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A method for producing, transporting and using hydrogen fluoride, comprising:

(a) synthesizing hydrogen fluoride by placing a solid source of hydrogen fluoride in a cartridge;

placing the cartridge in a controlled atmosphere chamber;

heating the cartridge to greater than the thermal decomposition temperature of the crystalline source of hydrogen fluoride to form gaseous hydrogen fluoride in the chamber; and using a carrier gas selected from the group consisting of dry $O_2$ and dry air to remove the gaseous hydrogen fluoride from the chamber;

(b) exposing a substance to be soldered to the synthesized hydrogen fluoride in the carrier gas, wherein said method results in a treatment of said substance which enables solder to be reflowed on a surface at a later time;

(c) soldering the surface with fluxless soldering.

* * * * *